United States Patent
Zhao et al.

(10) Patent No.: US 9,215,691 B2
(45) Date of Patent: Dec. 15, 2015

(54) RESOURCE OPERATION METHOD AND APPARATUS

(71) Applicant: HUAWEI TECHNOLOGIES CO., LTD., Shenzhen, Guangdong (CN)

(72) Inventors: Dong Zhao, Shanghai (CN); Kai Zhang, Shanghai (CN)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 0 days.

(21) Appl. No.: 14/505,869

(22) Filed: Oct. 3, 2014

(65) Prior Publication Data
US 2015/0018000 A1   Jan. 15, 2015

Related U.S. Application Data

(63) Continuation of application No. PCT/CN2012/074919, filed on Apr. 28, 2012.

(51) Int. Cl.
*H04W 72/02* (2009.01)
*H04W 16/10* (2009.01)
*H04W 24/02* (2009.01)
*H04W 84/18* (2009.01)

(52) U.S. Cl.
CPC .............. *H04W 72/02* (2013.01); *H04W 16/10* (2013.01); *H04W 24/02* (2013.01); *H04W 84/18* (2013.01)

(58) Field of Classification Search
CPC ... H04W 16/10; H04W 72/02; H04W 72/082; H04W 84/18; H04W 24/02; H04W 52/04; H04W 16/14; H04W 28/18

USPC .............. 455/452.1, 454, 434; 370/312, 329; 375/296
See application file for complete search history.

(56) References Cited

U.S. PATENT DOCUMENTS

| | | | |
|---|---|---|---|
| 2009/0325625 A1 | 12/2009 | Hugl et al. | |
| 2010/0080323 A1* | 4/2010 | Mueck et al. | 375/296 |
| 2011/0039495 A1* | 2/2011 | Sawai et al. | 455/62 |
| 2011/0092195 A1 | 4/2011 | Hussein et al. | |

FOREIGN PATENT DOCUMENTS

| | | |
|---|---|---|
| CN | 101207536 | 6/2008 |
| CN | 101420292 | 4/2009 |
| CN | 101883436 | 11/2010 |

(Continued)

OTHER PUBLICATIONS

Extended European Search Report dated Apr. 23, 2015 in corresponding European Patent Application No. 12875467.8.

(Continued)

*Primary Examiner* — Phuoc H Doan
(74) *Attorney, Agent, or Firm* — Staas & Halsey LLP (57) ABSTRACT

An embodiment of the present invention discloses a resource operation method and an apparatus thereof. The method includes: determining whether a conflict exists in the two operations; and if a conflict exists in two operations, implementing conflict coordination on execution of the two operations; wherein one of the two operations is a first operation on a first resource, and the other one of the two operations is a second operation on the first resource or a third operation on a related resource of the first resource. Through the present invention, a possible operation conflict can be discovered in a timely manner during an operation on a resource, thereby avoiding the operation conflict.

20 Claims, 6 Drawing Sheets

(56) References Cited

FOREIGN PATENT DOCUMENTS

| EP | 2487951 A1 | 8/2012 |
|---|---|---|
| EP | 2544485 | 1/2013 |
| JP | 2010539760 | 12/2010 |
| JP | 2013526192 | 6/2013 |
| WO | WO2009033500 | 3/2009 |
| WO | 2011/050753 A1 | 5/2011 |
| WO | WO2011134401 | 11/2011 |

OTHER PUBLICATIONS

Feng et al. "Self-Organizing Networks (SON) in 3GPP Long Term Evolution", Novel Mobile Radio Research GmbH, May 2008, pp. 1-15.

International Search Report mailed Feb. 7, 2013, in corresponding International Patent Application No. PCT/CN2012/074919.

PCT International Search Report issued on Feb. 7, 2013 in corresponding International Patent Application No. PCT/CN2012/074919.

"3rd Generation Partnership Project; Technical Specification Group Services and System Aspects; Telecommunication Management; Self-Organizing Networks (SON) Policy Network Resource Model (NRM) Integration Reference Point (IRP); Requirements (Release 10)", 3GPP TS 32.521 V10.1.0, Dec. 2010, pp. 1-26.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 3GPP TS 32.522 V11.1.0, Dec. 2011, pp. 1-32.

"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 3GPP TS 32.762 V11.1.0, Mar. 2012, pp. 1-56.

"3rd Generation Partnership Project; Technical Specification Group Services and System Aspects; Telecommunication management; Trace Management Integration Reference Point (IRP); Information Service (IS) (Release 11)", 3GPP TS 32.442 V11.2.0, Mar. 2012, pp. 1-28.

"3rd Generation Partnership Project; Technical Specification Group Services and System Aspects; Telecommunication management; Subscriber and equipment trace; Trace control and configuration management (Release 11)", 3GPP TS 32.422 V11.3.0, Mar. 2012, pp. 1-121.

Notice of Reasons for Rejection, dated Oct. 6, 2015, in corresponding Japanese Application No. 2015-503728 (7 pp.).

*Discussion paper about Son Coordination between more than two SON functions*, 3GPP TSG SA WG5 (Telecom Management) Meeting #81, S5-120183, Feb. 6-10, 2012, Dresden, Germany (2 pp.).

*Add a new SON Coordination function*, Change Request, 3GPP TSG-SA5 (Telecom Management), S5-120652, SA5#82, Mar. 26-30, 2012, San Jose del Cabo, Mexico (2 pp.).

*Discussion on SON coordination*, 3GPP TSG-SA5 (Telecom Management), S5-120667, Meeting SA5#82, Mar. 26-30, 2012, San Jose del Cabo, Mexico (6 pp.).

\* cited by examiner

RESOURCE OPERATION METHOD AND APPARATUS

CROSS-REFERENCE TO RELATED APPLICATIONS

This application is a continuation of International Application No. PCT/CN2012/074919, filed on Apr. 28, 2012, which is hereby incorporated by reference in its entirety.

TECHNICAL FIELD

Embodiments of the present invention relate to the field of telecommunications, and in particular, to a resource operation method and apparatus.

BACKGROUND

A self organizing network (SON) is critical thematic work for standardization raised by the $3^{rd}$ generation partnership project (3GPP) standards organization during the working period of Release 8/9/10, and is mainly used for implementing, as much as possible, automatic processes in network planning, deployment, optimization and maintenance stages, to reduce conventional manual operations and lower maintenance costs for a network operator.

However, because the SON generally integrates many automatic functions, these automatic functions may conflict with each other in an operating process, and the prior art does not provide a solution to coordinate the conflicts between the SON functions.

SUMMARY

In one aspect, the present invention provides a resource operation method, where the method includes: if a conflict exists in multiple operations on a first resource, implementing conflict coordination on execution of the multiple operations; or, if a conflict exists between an operation on a first resource and an operation on a related resource of the first resource, implementing conflict coordination on execution of the operation on the first resource and the operation on the related resource of the first resource, where the first resource includes any one or more of the following: a cell, a base station, a parameter of the cell, and a parameter of the base station, and the related resource of the first resource includes any one or more of the following: a resource that is set with an association with the first resource, a resource that is adjacent to the first resource, and a resource that has a mutual influence with the first resource.

Correspondingly, in another aspect, the present invention further provides a resource operation apparatus, where the apparatus includes: a determining unit, configured to determine whether a conflict exists in multiple operations on a first resource, or determine whether a conflict exists between an operation on a first resource and an operation on a related resource of the first resource; and a processing unit, configured to, when a determination result of the determining unit is that a conflict exists in the multiple operations on the first resource, implement conflict coordination on execution of the multiple operations, or when a determination result of the determining unit is that a conflict exists between the operation on the first resource and the operation on the related resource of the first resource, implement conflict coordination on execution of the operation on the first resource and the operation on the related resource of the first resource, where the first resource includes any one or more of the following: a cell, a base station, a parameter of the cell, and a parameter of the base station, and the related resource of the first resource includes any one or more of the following: a resource that is set with an association with the first resource, a resource that is adjacent to the first resource, and a resource that has a mutual influence with the first resource.

In the technical solutions provided by the embodiments of the present invention, by determining whether a conflict exists in multiple operations on a first resource, or whether a conflict exists between an operation on a first resource and an operation on a related resource of the first resource, a possible operation conflict can be discovered in a timely manner; and in the embodiments of the present invention, after a possible operation conflict is discovered, by implementing coordination on execution of the multiple operations or on execution of the operation on the first resource and the operation on the related resource of the first resource, occurrence of the operation conflict is avoided.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
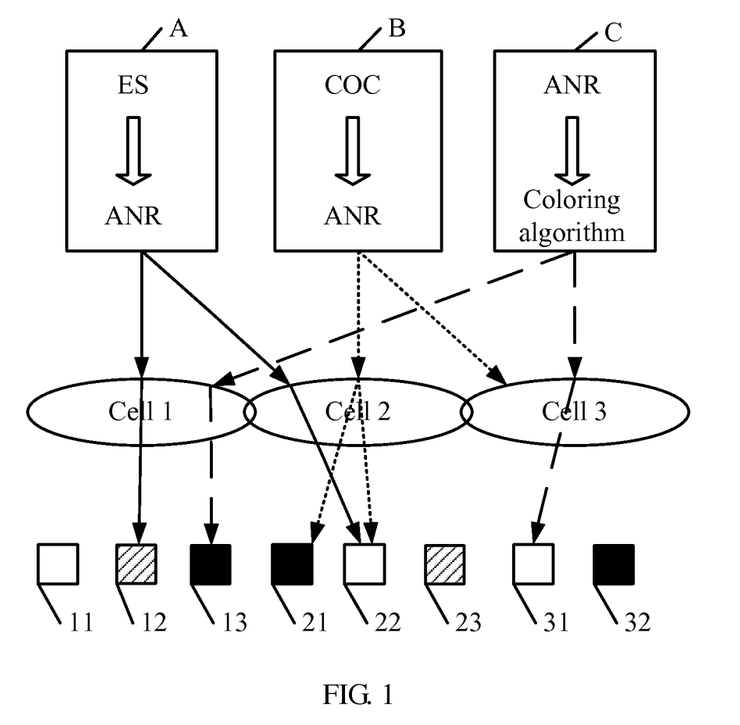
FIG. 1 is a schematic diagram for illustrating conflict types according to the present invention.

The embodiment of the present invention mainly uses a SON operation as an example to describe a resource operation method. It can be understood that the operation mentioned in the embodiment of the present invention is not limited to a SON operation and may also be a manual operation. It is known to persons skilled in the art that, many SON operations may be implemented through manual operations, for example, a technician may configure a neighbor relationship of a cell to achieve a similar function as an automatic neighbor relationship (ANR) in a SON, that is, to enable a base station to obtain the neighbor relationship. Further, the operation mentioned in this embodiment may be a single operation, such as an ANR operation, and may also be a combination of some operations, where coordinating operations generally form an operation combination, and the coordinating operations in the operation combination can be executed to achieve certain purposes such as optimization of a neighboring cell and energy saving of a cell. For example, an operation A in FIG. 1 is substantially a combination of an energy saving (ES) operation and an ANR operation, an operation B in FIG. 1 is substantially a combination of a cell outage compensation (COC) operation and an ANR operation, and an operation C in FIG. 1 is substantially a combination of an ANR operation and a coloring algorithm operation. An object of an operation in this embodiment may be referred to as a "resource", and the resource may be one or more of a base station, a cell, a parameter of the base station, and a parameter of the cell. For example, when an operation is performed on a certain cell, the resource is the cell; when an operation is performed on a base station, the resource is the base station; and when an operation is performed on a parameter of the cell or a parameter of the base station, for example, a transmitter power (Tx Power) parameter of an antenna, also known as "antenna power" for short, or a tilt parameter of an antenna, which are both parameters of a cell, the resource on which the operation is performed is the parameter. The embodiment of the present invention is basically described with the resource being a parameter, but apparently, it is also applicable, directly or after simple transformation, to a case that the resource is a cell or a base station. Besides, the Tx Power parameter and/or the Tilt parameter is generally used to change the coverage of a cell, and the Tx Power parameter and the Tilt parameter are also parameters often involved in operations such as the COC and cell coverage optimization (CCO).

The embodiment of the present invention also involves the concept of a related resource, and the concept of a related resource in the embodiment of the present invention is described below by taking a first resource as an example. The related resource of the first resource includes any one or more of the following: a resource that is set with an association with the first resource, a resource that is adjacent to the first resource, and a resource that has a mutual influence with the first resource.

The association may be set by a user, for example, a user may set an association between a cell 1 and a cell 2 according to a requirement, and the cell 1 and the cell 2 are related resources. The resource that is adjacent to the first resource mainly means that: when the first resource is a cell, a neighboring cell of the cell is a related resource of the cell; or when the first resource is a base station, a neighboring base station of the base station is a related resource of the base station; or when the first resource is a parameter of a cell, a parameter of a neighboring cell of the cell is a related resource of the first resource; or when the first resource is a parameter of a base station, a parameter of a neighboring base station of the base station is a related resource of the first resource. The resource that has a mutual influence with the first resource refers to a resource, of which at least one of a working range, working time and an working effect changes due to the operation on the first resource. For example, for the TX Power parameter and the Tilt parameter of the cell 1, when the TX Power parameter is modified, a working range, application time or a working effect of the Tilt parameter may change, so the TX Power and the Tilt are resources mutually influencing each other.

Specifically, several common related resources are described in the following, for example, when the first resource is a tilt of an antenna, a related resource of the first resource includes: power of the antenna and/or an azimuth of the antenna; or when the first resource is power of an antenna, a related resource of the first resource includes: a tilt of the antenna and/or an azimuth of the antenna; or when the first resource is an azimuth of an antenna, a related resource of the first resource includes: power of the antenna and/or a tilt of the antenna.

In another example, when the first resource is a cell individual offset (CIO), a related resource of the first resource is a cell load; or when the first resource is a cell load, a related resource of the first resource is a CIO; or when the first resource is a cell, a related resource of the first resource is a neighboring cell of the cell; or when the first resource is a base station, a related resource of the first resource is a neighboring base station of the base station; or when the first resource is a parameter of a cell, a related resource of the first resource is a parameter of a neighboring cell of the cell; or when the first resource is a parameter of a base station, a related resource of the first resource is a parameter of a neighboring base station of the base station.

Because many operations to be performed on same or related resources are involved in the SON, conflicts may occur between the operations, so it is necessary to implement coordination on execution of the operations to avoid occurrence of the conflicts. Therefore, definition of the conflict mentioned in the embodiment of the present invention needs to be clarified first.

Referring to FIG. 1, FIG. 1 shows three operations A, B and C, where the operation A is a combination of an ES and an ANR operation, the operation B is a combination of a COC operation and an ANR operation, and the operation C is a combination of an ANR operation and a coloring algorithm operation. FIG. 1 also shows two types of resources: one type of resources are cells, including: a cell 1, a cell 2 and a cell 3; and the other type of resources are parameters of the cells, including: parameters 11, 12 and 13 of the cell 1, parameters 21, 22 and 23 of the cell 2, and parameters 31 and 32 of the cell 3. In FIG. 1, the operation A is used to operate the parameters 12 and 22, the operation B is used to operate the parameters 21, 22 and 31, and the operation C is used to operate the parameters 13 and 31. Assuming that the parameter 12 is a Tx Power parameter and the parameter 22 is a Tilt parameter, when the operation A executes the ES operation, the ES operation decreases the parameter 12 of the cell 1 to reduce power consumption of the cell 1; and because the parameter 12 is decreased, a coverage area of the cell 1 is reduced, so the ES operation further increases the parameter 22 to increase a coverage area of the cell 2, to reduce an impact caused by the reduction of the coverage area of the cell 1.

In some implementation manners, the operation A and the operation B may simultaneously modify the parameter 22, thereby causing a conflict between the operation A and the operation B. For example, the operation A is used to increase the parameter 22, the operation B is used to decrease the parameter 22, and if the operation A and the operation B are performed at the same time, the parameter 22 may be increased, decreased or unchanged; and even if the operation A and the operation B are both used to increase or decrease the parameter 22, when the operation A and the operation B are performed at the same time, an increment or a decrement of the parameter 22 may not meet an expectation of the operation A or the operation B, and the increment or the decrement of the parameter 22 cannot be predicted. Therefore, a conflict occurs when the operation A and the operation B modify the parameter 22 at the same time, and this conflict form may be defined as that "when execution times of multiple operations (the operation A and the operation B) on a same resource (the parameter 22) are identical, a conflict exists in the multiple operations".

In some implementation manners, the operation A and the operation B may be respectively performed on the parameter 12 and the parameter 13 at the same time. In many cases, the parameter 12 and the parameter 13 may affect each other. For example, the parameter 12 is the Tx Power parameter of the cell 1, the parameter 13 is the Tilt parameter of the cell 1, and the modification of the Tx Power parameter and/or the Tilt parameter may change the coverage of the antenna of the cell 1; therefore, when the operation A decreases the parameter 12 for the purpose of energy saving, the coverage of the cell 1 is reduced, and generally in this case, the operation A may further modify the parameter 21 (the Tilt parameter of the antenna of the cell 2) to increase the coverage of the cell 2, so as to achieve a purpose of coverage optimization. However, if the operation C modifies the parameter 13 in this case, the coverage and the power of the cell 1 change, and an expected purpose of the operation A cannot be achieved because no matter whether the operation C increases or decreases the parameter 13, the purpose of coverage optimization cannot be achieved, and in this case, a conflict exists between the operation A and the operation C. This conflict form may be defined as that "when execution times of multiple operations (the operation A and the operation C) on related resources (the parameter 12 and the parameter 13) are identical, a conflict exists in the multiple operations".

In some implementation manners, the operation A or the operation B may modify a same parameter at different time. For example, the operation A first modifies the parameter 22 of the cell 2 at a first time, the operation B modifies the parameter 22 of the cell 2 at a second time, and the first time and the second time are smaller than an effective time of the operation A, where the effective time refers to a time period after the operation A modifies the parameter 22, and if the parameter 22 is further modified by another operation within the effective time, the operation A cannot achieve the expected purpose. The effective time may be defined as a "confliction period". The conflict in this case may be defined as that "when an interval between execution times of multiple operations (the operation A and the operation B) on a same resource (the parameter 22) is smaller than a confliction period, a conflict exists in the multiple operations".

In some implementation manners, the operation A and the operation B may modify related parameters at different time. For example, the operation A modifies the parameter 12 at a first time, the operation B modifies the parameter 22 at a second time, and the parameter 12 and the parameter 22 are related parameters. If an interval between the first time and the second time does not exceed a confliction period of the operation A, a conflict exists between the operation A and the operation B. This conflict form may be defined as that "when an interval between execution times of multiple operations (the operation A and the operation B) on related parameters (the parameter 12 and the parameter 22) is smaller than a confliction period, a conflict exists in the multiple operations".

Four types of conflicts involved in the embodiment of the present invention are described and defined hereinbefore with reference to FIG. 1. Several forms of the confliction period involved in the conflicts are described hereinafter with reference to FIG. 2.

Figure 2:
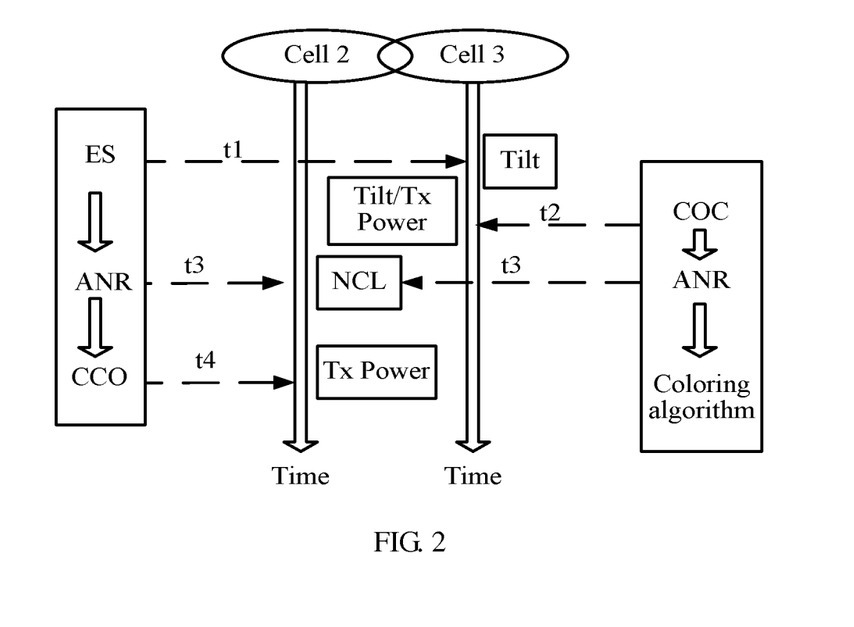
FIG. 2 is a schematic diagram for illustrating confliction periods according to the present invention.

Referring to FIG. 2, a vertical arrow in FIG. 2 represents time, and the cell 2 and the cell 3 in FIG. 2 are neighboring cells. When an ES operation is performed on the cell 2, a Tilt parameter of the cell 3 needs to be modified; when an ANR operation is performed on the cell 2, a neighbor cell list (NCL) parameter of the cell 2 needs to be operated; and when a CCO operation is performed on the cell 2, the Tx Power parameter of the cell 2 needs to be modified. When a COC operation is performed on the cell 3, the Tilt parameter or the Tx Power parameter of the cell 3 needs to be modified; however, to avoid a conflict between the ES operation and the CCO operation, the CCO operation needs to be performed after an effective time period of the ES operation, that is, at least after a time t2, where (t2–t1) is a confliction period of the ES operation and the COC operation, and this type of confliction period is also referred to as "a confliction period of same or related parameters of a same base station or a same cell". Furthermore, in FIG. 2, when the COC modifies the Tx Power parameter of the cell 3, because the Tx Power parameter of the cell 3 is associated with the Tx Power parameter of the cell 2, the CCO needs to modify the Tx Power parameter of the cell 2 at least after a time t4; in this case, a time period (t4–t2) is a confliction period of the COC operation and the CCO operation, and this type of confliction period is also referred to as "a confliction period of same parameters of different base stations or cells". In addition, in FIG. 2, because the Tilt parameter of the cell 3 and the Tx Power parameter of the cell 2 may both affect the coverage of the cell 2 and the cell 3, a conflict may occur when operations are performed on the two parameters at different time, where a time period (t4–t1) is a confliction period of the ES operation and the CCO operation, and this operation conflict is also referred to as "a conflict between related parameters of different base stations or cells". It should be noted that the confliction period of each operation may be uniformly set, that is, confliction periods corresponding to all operations are identical, for example, set to T; or the confliction periods may be respectively designated for different operations, for example, the confliction period of the ES operation is designated as T1, and the confliction period of the CCO operation is designated as T2; and, when comparison is performed to determine whether an interval between execution times of the operations is smaller than a set confliction period, the set confliction period may be regarded as the uniformly set confliction period T, or the confliction period T1 designated for the ES operation, or the confliction period T2 designated for the CCO operation, or a greater value, a smaller value, or a sum (T1+T2) of the confliction period T1 designated for the ES operation and the confliction period T2 designated for the CCO operation.

The concepts of several types of conflicts and confliction periods mentioned in the embodiment of the present invention are described hereinbefore with reference to FIG. 1 and FIG. 2. The following specifically describes a process of how to discover a possible conflict and how to avoid occurrence of the conflict during the operation of resources in the embodiment of the present invention.

An embodiment of the present invention provides a resource operation method, where the method includes: if a conflict exists in multiple operations on a first resource, implementing conflict coordination on execution of the multiple operations; or, if a conflict exists between an operation on a first resource and an operation on a related resource of the first resource, implementing conflict coordination on execution of the operation on the first resource and the operation on the related resource of the first resource, where the first resource includes any one or more of the following: a cell, a base station, a parameter of the cell, and a parameter of the base station, and the related resource of the first resource includes any one or more of the following: a resource that is set with an association with the first resource, a resource that is adjacent to the first resource, and a resource that has a mutual influence with the first resource.

In a specific implementation process, the method further includes: determining whether a conflict exists in multiple operations on a first resource, or determining whether a conflict exists between an operation on a first resource and an operation on a related resource of the first resource.

The determining whether a conflict exists in multiple operations on a first resource includes: when execution times of the multiple operations on the first resource are identical, determining that a conflict exists in the multiple operations on the first resource; or, when an interval between execution times of the multiple operations on the first resource is within a set confliction period, determining that a conflict exists in the multiple operations on the first resource.

The determining whether a conflict exists between an operation on a first resource and an operation on an related resource of the first resource includes: when execution times of the operation on the first resource and the operation on the related resource of the first resource are identical, determining that a conflict exists between the operation on the first resource and the operation on the related resource of the first resource; or, when an interval between execution times of the operation on the first resource and the operation on the related resource of the first resource is within a set confliction period, determining that a conflict exists between the operation on the first resource and the operation on the related resource of the first resource.

Figure 3:
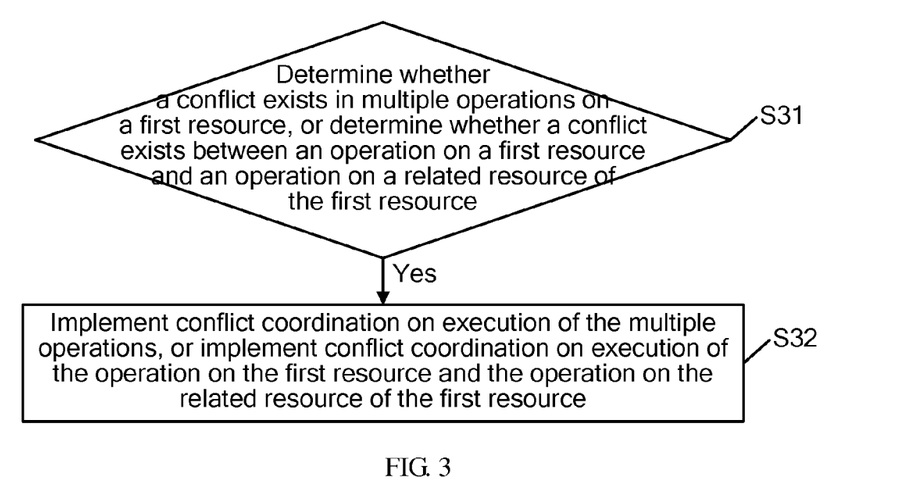
FIG. 3 is a schematic flowchart of a resource operation method according to a first embodiment of the present invention.

FIG. 3 is a schematic flowchart of a resource operation method according to a first embodiment of the present invention, where the method includes the following content.

S31: Determine whether a conflict exists in multiple operations on a first resource, or determine whether a conflict exists between an operation on a first resource and an operation on a related resource of the first resource.

When execution times of the multiple operations on the first resource are identical, it is determined that a conflict exists in the multiple operations on the first resource; or, when an interval between execution times of the multiple operations on the first resource is within a set confliction period, it is determined that a conflict exists in the multiple operations on the first resource; or, when execution times of the operation on the first resource and the operation on the related resource of the first resource are identical, it is determined that a conflict exists between the operation on the first resource and the operation on the related resource of the first resource; or, when an interval between execution times of the operation on the first resource and the operation on the related resource of the first resource is within a set confliction period, it is determined that a conflict exists between the operation on the first resource and the operation on the related resource of the first resource.

S32: If it is determined that a conflict exists in the multiple operations on the first resource in S31, implement conflict coordination on execution of the multiple operations; or if it is determined that a conflict exists between the operation on the first resource and the operation on the related resource of the first resource in S31, implement conflict coordination on execution of the operation on the first resource and the operation on the related resource of the first resource.

The implementing conflict coordination on execution of the multiple operations, or the implementing conflict coordination on execution of the operation on the first resource and the operation on the related resource of the first resource is mainly to coordinate an execution sequence or execution times of the operations, to avoid occurrence of the foregoing four possible forms of conflicts.

In this embodiment, by determining whether a conflict exists in multiple operations on a first resource, or whether a conflict exists between an operation on a first resource and an operation on a related resource of the first resource, a possible conflict is discovered; and in this embodiment, after a possible conflict is discovered, by implementing coordination on execution of the multiple operations or on execution of the operation on the related resource, occurrence of the conflict is avoided during the operation on the same resource or the related resource.

The embodiment in FIG. 3 is further described with reference to FIG. 4 to FIG. 7. FIG. 4 to FIG. 7 are specific to the specific implementations of how to discover a possible conflict and how to avoid occurrence of the conflict.

Figure 4:
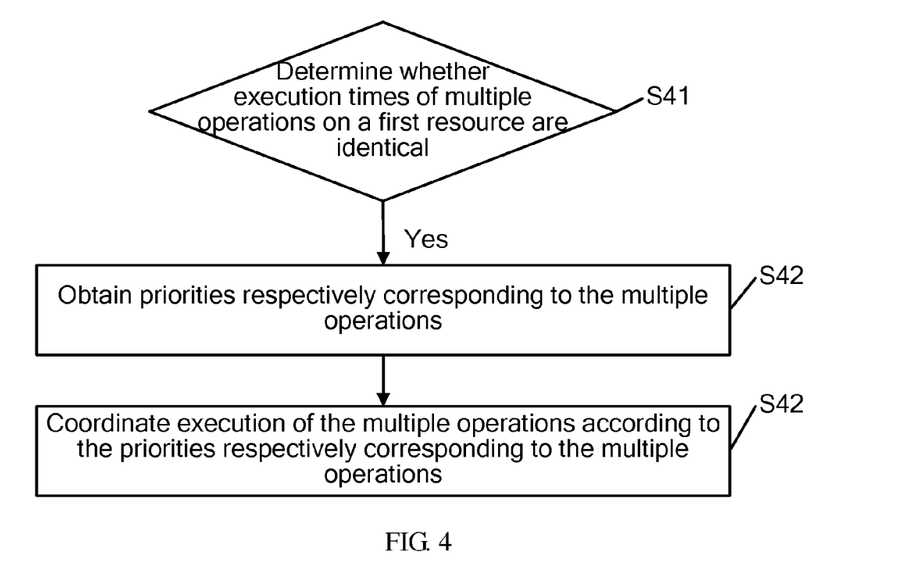
FIG. 4 is a schematic flowchart of a resource operation method according to a second embodiment of the present invention.

FIG. 4 is a schematic flowchart of a resource operation method according to a second embodiment of the present invention, where the method includes the following content.

S41: Determine whether execution times of the multiple operations on the first resource are identical, and if the execution times are identical, determine that a conflict exists in the multiple operations, and perform S42.

A node that executes this embodiment in S41 may be a server that is uniformly deployed for conflict coordination, or a base station, or a cell, and may receive multiple SON requests at the same time, where each SON request is used to instruct the node to operate the same resource (the first resource) therein, to implement the corresponding SON function. When the first resource is a parameter of a cell or a parameter of a base station, in some SON requests, the node is required to increase a value of the first resource, while in some SON requests, the node is required to decrease the value of the first resource. Apparently, if these SON requests are executed at the same time, the first resource is repeatedly modified and becomes unpredictable, which may cause deterioration of network performance and even lead to chaos in a network. Therefore, when it is discovered that these SON requests are used to operate the same resource at the same time, a conflict exists between the operations corresponding to these SON requests, so conflict coordination described in S42 to S43 needs to be performed.

S42: Obtain priorities respectively corresponding to the multiple operations.

The obtained priorities respectively corresponding to the multiple operations may be preconfigured to the multiple operations, for example, in a network planning stage, a first priority is configured for an ES operation, a second priority is configured for a CCO operation, and the like.

S43: Coordinate execution of the multiple operations according to the priorities respectively corresponding to the multiple operations.

The coordinating execution of the multiple operations includes any one or a combination of the following: adjusting an execution sequence of the multiple operations, forbidding execution of an operation with a relatively low priority in the multiple operations, and adjusting the execution time of each operation in the multiple operations to make an interval between the execution times of the operations greater than or equal to a set confliction period.

The adjusting an execution sequence of the multiple operations may be implementing the operations sequentially according to the priorities. The forbidding execution of an operation with a relatively low priority in the multiple operations may be that, for example, assuming that an operation A, an operation B and an operation C exist and the priority of the operation A is the highest, the priority of the operation B is intermediate, and the priority of the operation C is the lowest, only the operation A can be executed, and the execution of the operation B and the operation C which have lower priorities than the operation A in the three operations is forbidden; or the operation A and the operation B are executed, and the execution of the operation C which has a lower priority than both the operation A and the operation B in the three operations is forbidden. For example, the ES operation corresponds to a first priority (highest), the COC operation corresponds to a second priority, and when a conflict occurs in a case that the ES operation and the COC operation need to be performed on the Tilt parameter of the cell 2 at the same time, according to the priorities of the ES operation and the ANR operation, the ES operation is executed preferentially, and the COC operation is delayed or is rejected. It should be noted that, if the ES operation is also set with a confliction period, the execution time of the COC operation should be delayed till the confliction period ends.

This embodiment mainly puts forward an operation coordinating method when a conflict occurs in a case that multiple operations are performed on a same resource at the same time, so as to avoid the conflict.

Figure 5:
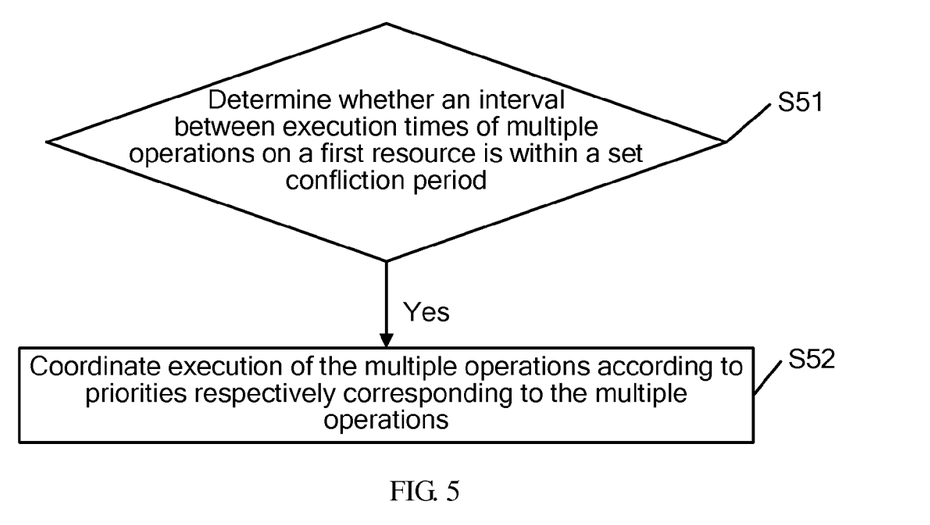
FIG. 5 is a schematic flowchart of a resource operation method according to a third embodiment of the present invention.

FIG. 5 is a schematic flowchart of a third embodiment of the resource operation method according to the present invention, where the method includes the following content.

S51: Determine whether an interval between execution times of multiple operations on a first resource is within a set confliction period, and if yes, determine that a conflict exists, and perform S52.

S52: Coordinate execution of the multiple operations according to priorities respectively corresponding to the multiple operations.

The priorities respectively corresponding to the multiple operations may be preconfigured. Further, the priorities respectively corresponding to the multiple operations may be obtained before S52.

Specifically, the coordinating execution of the multiple operations includes: adjusting an execution sequence of the multiple operations, forbidding execution of an operation with a relatively low priority in the multiple operations, and adjusting the execution time of each operation in the multiple operations to make an interval between the execution times of the operations greater than or equal to a set confliction period. In this embodiment, the execution time of each operation in the multiple operations is mainly adjusted to make the interval between the execution times of the operations greater than or equal to the set confliction period.

The following describes this embodiment by using an example where the operations are the ES operation and the COC operation, and the first resource is the Tilt parameter of the cell 2.

The cell 1 executes the ES operation at a time t1 to modify the Tilt parameter of the cell 2, and the ES operation is set with a confliction period, where the confliction period is T (for example, half an hour or 2 hours); the cell 2 needs to perform the COC operation at a time t2 (a difference between t2 and t1 is smaller than T), to modify the Tilt parameter of the cell 2; because the difference between t2 and t1 is smaller than T, the COC operation and the ES operation of the cell 2 conflict with each other, that is, multiple operations on the same resource at different times conflict with each other, and in this case, the cell 2 cannot execute the COC operation at the time t2, that is, the cell 2 is forbidden from executing the COC operation within the time (t1+T). It should be noted that, if the priority of the COC operation is higher than the priority of the ES operation, the cell 2 can interrupt the execution of the ES operation and perform the COC operation.

Figure 6:
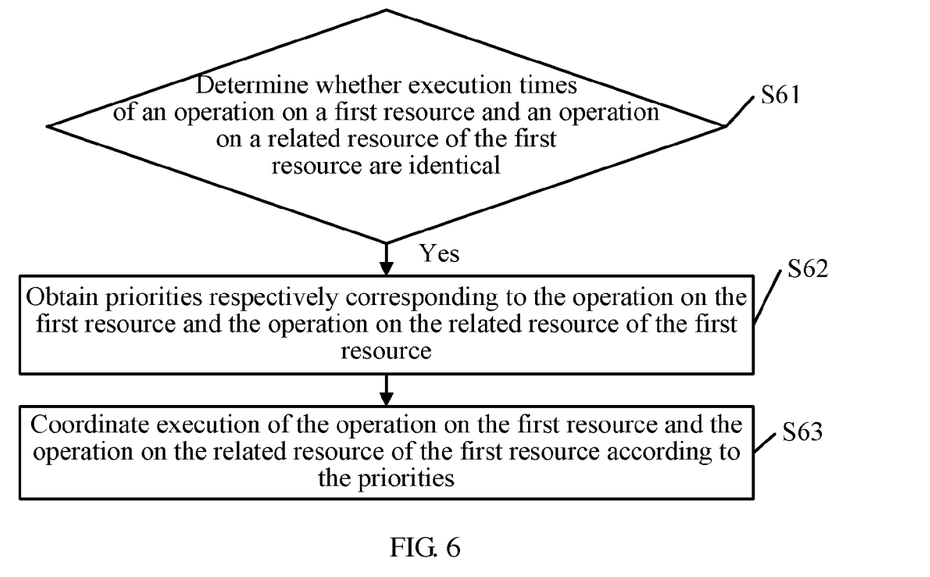
FIG. 6 is a schematic flowchart of a resource operation method according to a fourth embodiment of the present invention.

FIG. 6 is a schematic flowchart of a fourth embodiment of the resource operation method according to the present invention, where the method includes the following content.

S61: Determine whether execution times of an operation on a first resource and an operation on a related resource of the first resource are identical, and if the execution times are identical, perform S62.

S62: Obtain priorities respectively corresponding to the operation on the first resource and the operation on the related resource of the first resource.

The priority corresponding to the operation on the first resource and the priority corresponding to the operation on the related resource of the first resource may be preconfigured.

S63: Coordinate execution of the operation on the first resource and the operation on the related resource of the first resource according to the priorities.

Specifically, the coordinating execution of the operation on the first resource and the operation on the related resource of the first resource includes any one or more of the following: adjusting an execution sequence of the operation on the first resource and the operation on the related resource of the first resource, forbidding execution of an operation with a lower priority in the operation on the first resource and the operation on the related resource of the first resource, and adjusting execution time of each operation in the operation on the first resource and the operation on the related resource of the first resource to make an interval between the execution times of the operations greater than or equal to a confliction period.

The embodiment in FIG. 6 is similar to the embodiment in FIG. 4, and a difference lies in that the embodiment in FIG. 6 is no longer specific to the same resource, but to related resources. An association between the resources may be predefined, for example, when a resource is the Tilt parameter of the cell 1, it is defined that related resources of the Tilt parameter of the cell 1 include: the Tx Power parameter of the cell 1, and the Tilt parameter and the Tx Power parameter of the cell 2 (a neighboring cell of the cell 1).

Figure 7:
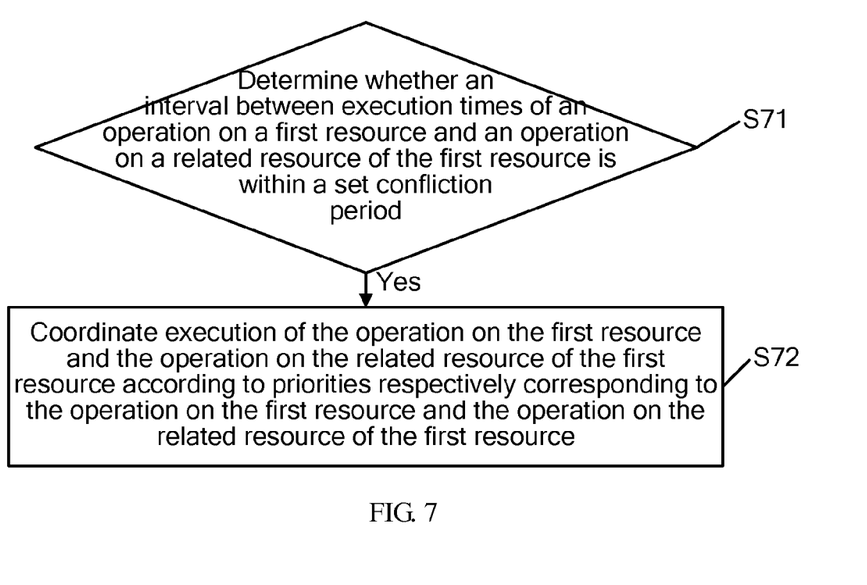
FIG. 7 is a schematic flowchart of a resource operation method according to a fifth embodiment of the present invention.

FIG. 7 is a schematic flowchart of a fifth embodiment of the resource operation method according to the present invention, where the method includes the following content.

S71: Determine whether an interval between the execution times of the operation on the first resource and the operation on the related resource of the first resource is within a set confliction period, and if yes, determine that a conflict exists, and perform S72.

S72: Coordinate execution of the operation on the first resource and the operation on the related resource of the first resource according to priorities respectively corresponding to the operation on the first resource and the operation on the related resource of the first resource.

The priorities respectively corresponding to the operation on the first resource and the operation on the related resource of the first resource may be pre-configured. Further, the priorities respectively corresponding to the operation on the first resource and the operation on the related resource of the first resource may be obtained before S72.

Specifically, the coordinating execution of the operation on the first resource and the operation on the related resource of the first resource includes any one or more of the following: adjusting an execution sequence of the operation on the first resource and the operation on the related resource of the first resource, forbidding execution of an operation with a lower priority in the operation on the first resource and the operation on the related resource of the first resource, and adjusting execution time of each operation in the operation on the first resource and the operation on the related resource of the first resource to make an interval between the execution times of the operations greater than or equal to a confliction period.

The embodiment in FIG. 7 is similar to the embodiment in FIG. 5, and a difference lies in that the embodiment in FIG. 7 is specific to the first resource and a related resource of the first resource.

The following describes this embodiment by using an example where the operations are the ES operation and the COC operation, the first resource is the Tx Power parameter of the cell 1, and a related resource of the first resource is the Tilt parameter of the cell 2.

The cell 1 executes the ES operation at a time t1 to modify the Tx Power parameter of the cell 1, and the ES operation is set with a confliction period, where the confliction period is T (for example, half an hour or 2 hours); the cell 2 needs to perform the COC operation at a time t2 (a difference between t2 and t1 is smaller than T), to modify the Tilt parameter of the cell 2; because the Tx Power parameter and the Tilt parameter are related parameters and the difference between t2 and t1 is smaller than T, the COC operation of the cell 2 and the ES operation of the cell 1 conflict with each other, that is, multiple operations on related resources at different times conflict with each other, and in this case, the cell 2 cannot execute the COC operation at the time t2, that is, the cell 2 is forbidden from executing the COC operation within the time (t1+T). However, if the priority of the COC operation is higher than the priority of the ES operation, the cell 2 can interrupt the execution of the ES operation and perform the COC operation.

Figure 8:
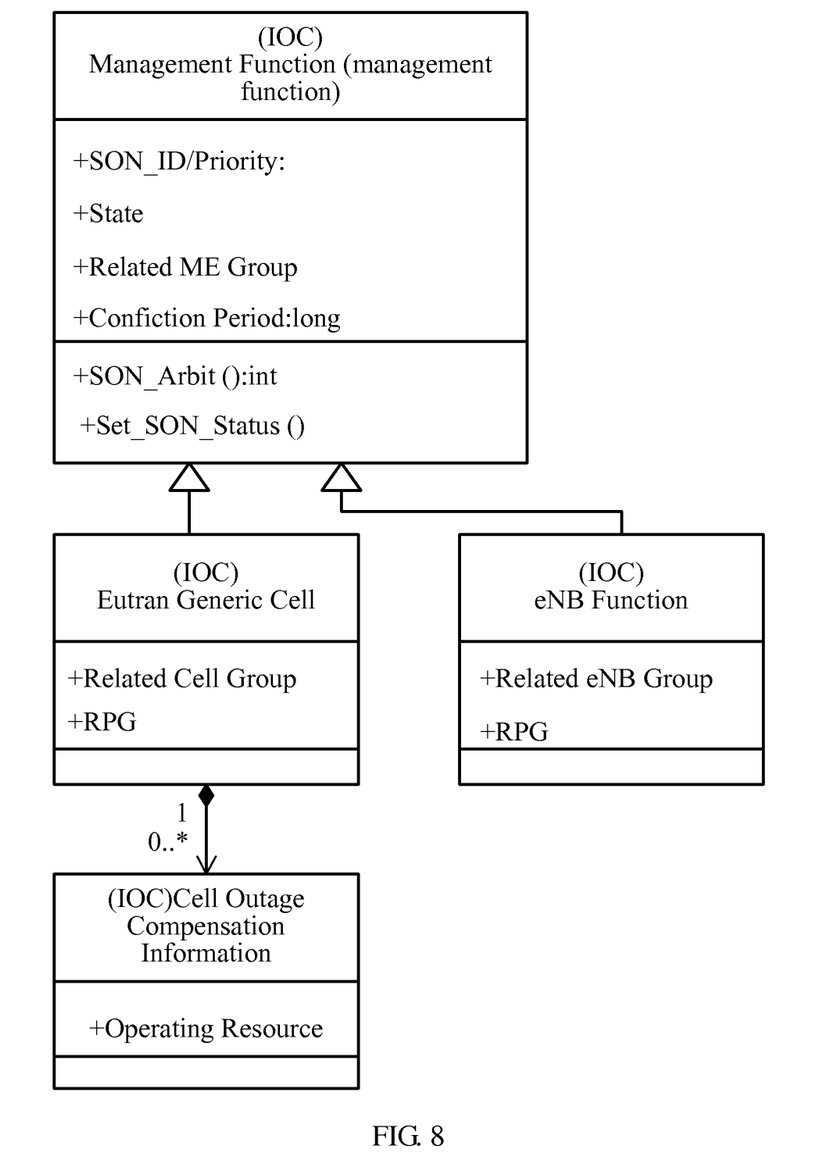
FIG. 8 is a schematic diagram for illustrating attribute information and operation functions of resources according to the present invention.

The embodiments in FIG. 4 to FIG. 7 describe the resource operation method of the present invention, and a resource attribute may be further added in a resource, to discover through the resource attribute whether an operation on the resource conflicts with another operation. Specifically, taking the first resource for example, the attribute information of the first resource includes any one or a combination of the following information:

An operator attribute, for example, is expressed as SON_ID(IDentity)/Priority, and used to record information of an operator who sets or modifies the first resource, where the information includes at least one piece of such information as operation name, type, and operation priority. For example, when the first resource is the Tx Power parameter of the cell 1 and the operation is the ES operation, the information of the ES operation that is recorded in the operator attribute includes: ES operation and priority 1 (that is, the highest priority).

A state attribute, for example, is expressed as State, and used to indicate an operation state of the first resource, where the operation state of the first resource mainly refers to a current operation state of the first resource, and includes: a modified state, a conflict state and a normal state; the "modified state" indicates that the first resource is currently under modification; the "conflict state" indicates that the first resource is currently in a confliction period of an operation, another operation cannot modify the first resource in this time period, and at least an operation with a priority lower than or equal to that of the current operation on the first resource cannot modify the first resource; and the "normal state" indicates that the first resource can be modified by another operation.

A related resource group (RRP) attribute, for example, is expressed as RRP, and used to record information about a related resource or a related resource list of the first resource, for example, when the first resource is the Tilt parameter of the cell 1, the first resource has associations with the Tx Power parameter of the cell 1, and the Tilt parameter and the Tx Power parameter of the cell 2 (a neighboring cell of the cell 1), and those parameters are related resources and may be expressed as: RRP={the Tilt parameter of the cell 1, the Tx Power parameter of the cell 1, the Tilt parameter of the cell 2, the Tx Power parameter of the cell 2}. Further, the RRP may include: a related cell group (RCG), a related parameters group (RPG), or a related base station group (ReG). In addition, the RPG may be a related parameters group of a cell, and may also be a related parameters group of a base station. It can be figured out through the related resource group attribute the specific related resources of the first resource, so as to provide reference for coordination between the related resources. For example, when the first resource is in the conflict state, another operation on the related resource of the first resource needs to be coordinated, that is, to figure out through the related resource list attribute the operation on the specific resource on which coordination is to be implemented. Corresponding related levels may be recorded for different related resources in the RRP, so that the operation on a related resource with a high related level is preferentially coordinated during the coordination process.

A confliction period (CP) attribute, for example, is expressed as CP, and used to indicate an effective time period of a conflict with the first resource, that is, when the State attribute is the conflict state, to indicate a duration of the conflict state. In the duration of the conflict state, an operation on the first resource or on a related resource of the first resource may conflict with the current operation on the first resource, which needs to be avoided as much as possible, unless the operation on the first resource or on the related resource of the first resource has a higher priority than that of the current operation on the first resource.

An operating resource (OR) list attribute, for example, is expressed as OR, and used to record information about another resource on which the operation on the first resource is implemented. For example, when the current operation on the first resource is the operation A and the operation A is also implemented on a second resource and a third resource, the information about the second resource and the third resource is recorded in the operating resource list attribute. The operating resource list attribute is set so that when an operation needs to be implemented on multiple resources, resources that may cause a conflict may be found from the operating resource list attribute.

The resource may also correspond to an operation function. The first resource is still used as an example to describe the operation function. The operation function of the first resource includes one or more of the following:

An operation arbitration function, for example, is expressed as SON_Arbitor( ), and used to implement coordination control on multiple operations when the first resource becomes an object that causes a conflict in the multiple operations. For example, when three operations A, B and C are to be implemented on the first resource at the same time, the SON_Arbitor( ) attribute may control an execution sequence of the operation A, the operation B and the operation C according to priorities of the operation A, the operation B and the operation C. The priorities of the operation A, the operation B and the operation C may be obtained from an identity attribute of the first resource because three operations are implemented on the first resource at this time. For example, when the operation B has the highest priority among the operation A, the operation B and the operation C, the SON_Arbitor( ) controls the first resource to be modified by the operation B first, and rejects any modification from the operation A and the operation C on the first resource during the modification effective period (confliction period) of the operation B.

A resource state attribute setting function, for example, is expressed as Set_SON_Status( ), and used to set a State attribute of the first resource, for example, when the operation A needs to modify the first resource, the operation A first sets the State attribute to "modified state" through a state setting function (for example, Set_Status( ) function), so as to inform another operation that the first resource is under modification and cannot be operated; or when the State attribute is "conflict state", some operations with a priority higher than that of the current operation may invoke the Set_Status operation, and set the State attribute to "normal state" through the Set_Status operation, thereby obtaining an operation permission over the first resource.

It should be noted that, the first resource is mainly used as an example to describe and exemplify the attribute information and operation function of a resource, which is apparently suitable for a related resource of the first resource or other resources. The attribute information and operation function can be flexibly selected according to a requirement, and are saved in a form of lists, for example, as shown in FIG. 8.

An instance is provided below to further describe some processes and principles to be followed in the resource operation method of the present invention.

Figure 9:
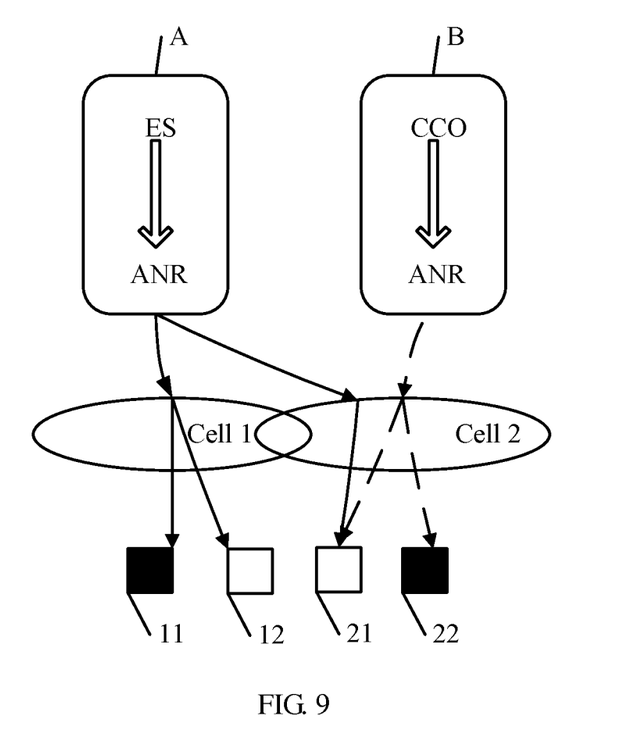
FIG. 9 is a schematic diagram for illustrating a resource operation method according to the present invention.

Referring to FIG. 9, the operation A and the operation B are multiple types of operations that may be performed on the cell 1 and the cell 2, and also considered as a SON operation group; therefore:

1) When the operation A is running, that is, a combination of the ES operation and the ANR operation is running, the parameter 11 of the cell 1 is decreased, where the parameter 11 is the Tx Power parameter of the cell 1, and meanwhile the parameter 21 of the cell 2 is adjusted, where the parameter 21 is the Tilt parameter of the cell 2, so as to ensure the coverage of the cell 1 while achieving a purpose of energy saving.

2) When the operation B is running, that is, a combination of the CCO operation and the ANR operation is running, the operation B may adjust the parameter 21 and/or parameter 22 of the cell 2, where the parameter 22 is the Tx Power parameter of the cell 2, to achieve a purpose of preferential cell coverage.

It can be seen from 1) and 2) that, a conflict may exist between the operation A and the operation B in running, and the operation A and the operation B need to be coordinated. A specific coordinating method may be as follows:

3) Related resource lists are first defined in network elements, and the network elements include the cell 1 and the cell 2, or base stations that serve the cell 1 and the cell 2, that is, the specific parameters are defined as related resources in the network elements, and the related resource lists may be related parameters lists, for example, {Tx Power, Azimuth, Tilt}, {CIO, TTT, Hyst}, and {NCL/NRT, Tx Power, Azimuth, Tilt}, where Azimuth refers to an azimuth of an antenna, Hyst refers to a hysteresis parameter of a cell, TTT is short for "Time To Trigger", that is, trigger time, NCL is short for "Neighbor Cell List", that is, a list of neighboring cells, and NRT is short for "Neighbor Relationship Table", that is, a table of neighbor relationships. The related resources may also be related cell lists, for example, {cell 1, cell 2}. The related resources may also be related base station lists, for example, {eNB1, eNB2}, where the eNB refers to an evolved base station. The related cells or base stations can be directly collected from the NCL and NRT.

Further, the related resource group not only includes the related parameters list, the related cell list or the related base station list, but also includes any combination of cells and parameters, for example, {cell 1-TxPower, cell 1-Tilt, cell 2-TxPower, cell 2-Tilt}.

Further, the correlations between the resources may be classified by strength, which may be reflected in the related resource group, for example, {(Level1: cell 1-TxPower, cell 1-Tilt), (Level2: cell 2-Tx Power, cell 2-Tilt), (Level3: cell 1, cell 2)}.

The related resource group defines the associations between the resources, conflict coordination may be implemented on operations on resources having associations therebetween, and during the coordination process, the conflict between the related resources with stronger associations may be preferentially coordinated according to the strength of the associations between the resources, for example, the conflict between the related resources (cell 1-TxPower, cell 1-Tilt) with the association strength of Level1 shall be preferentially coordinated.

4) The resources or related resources defined in 3) may correspond to one confliction period, or each of them may correspond to one confliction period.

5) When the ES operation is performed on the Tx Power parameter of the cell 1, coordination needs to be performed between the ES operation and an operation on the related resources of the Tx Power parameter of the operated cell 1, where the related resource of the Tx Power of the cell 1 can be known from the foregoing related resource group, and the related resource of the Tx Power of the cell 1 includes: the Tx Power parameter of the cell 2, and the Tilt parameters (including the Tilt parameter of the cell 1 and the Tilt parameter of the cell 2).

6) Specifically, the coordination is implemented according to priorities of the operations. For example, the priorities of the ES operation and the CCO operation are compared, and if the priority of the ES operation is lower than that of the CCO operation, the ES operation of the cell 1 is forbidden, and the CCO operation is performed to adjust the Tx Power parameter and/or Tilt parameter of the cell 2. In addition, if the CCO operation has a confliction period, after the CCO operation adjusts the Tx Power parameter and/or Tilt parameter of the cell 2, execution of the ES operation is forbidden in the confliction period. After the confliction period, the ES operation may be again initiated for the cell 1, and if the resources, including the resource to be operated by the ES operation and the related resource of the resource to be operated, do not conflict or are in the normal state, the ES operation can be performed normally.

Attribute information, such as an operator attribute, a state attribute, a confliction period attribute, may be added in the resource, and may also correspond to an operation function for the resource, such as a resource state attribute setting function.

The following describes an apparatus corresponding to the foregoing process of the method.

Figure 10:
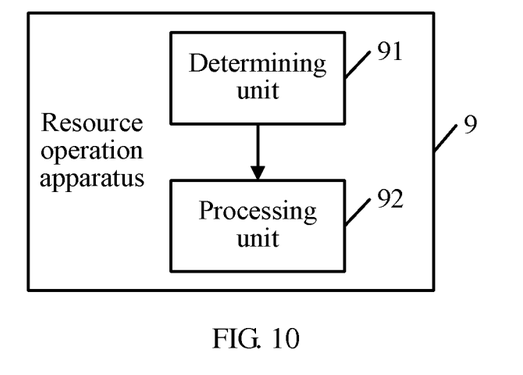
FIG. 10 is a schematic structural diagram of a resource operation apparatus according to an embodiment of the present invention.

FIG. 10 is a schematic structural diagram of an embodiment of a resource operation apparatus 9 according to the present invention, where the resource operation apparatus 9 includes: a determining unit 91 and a processing unit 92. This embodiment merely describes a structure of the resource operation apparatus 9. The resource operation apparatus 9 can implement the methods described in the foregoing method embodiments, and details are not repeated herein.

Specifically, the determining unit 91 is configured to determine whether a conflict exists in multiple operations on a first resource, or determine whether a conflict exists between an operation on a first resource and an operation on a related resource of the first resource.

When execution times of the multiple operations on the first resource are identical, a determination result of the determining unit 91 is that a conflict exists in the multiple operations on the first resource; or, when an interval between the execution times of the multiple operations on the first resource is within a set confliction period, a determination result of the determining unit 91 is that a conflict exists in the multiple operations on the first resource; or, when the execution times of the operation on the first resource and the operation on the related resource of the first resource are identical, a determination result of the determining unit 91 is that a conflict exists between the operation on the first resource and the operation on the related resource of the first resource; or, when an interval between the execution times of the operation on the first resource and the operation on the related resource of the first resource is within a set confliction period, a determination result of the determining unit 91 is that a conflict exists between the operation on the first resource and the operation on the related resource of the first resource.

The processing unit 92 is configured to, when the determination result of the determining unit 91 is that a conflict exists in the multiple operations on the first resource, implement conflict coordination on execution of the multiple operations, or when the determination result of the determining unit 91 is that a conflict exists between the operation on the first resource and the operation on the related resource of the first resource, implement conflict coordination on execution of the operation on the first resource and the operation on the related resource of the first resource.

The implementing, by the processing unit 92, the conflict coordination on execution of the multiple operations, or on execution of the operation on the first resource and the operation on the related resource of the first resource is mainly to coordinate the execution sequence or execution time of the operations, to avoid the occurrence of the foregoing four possible forms of conflicts.

In this embodiment, by determining whether a conflict exists in multiple operations on a first resource, or whether a conflict exists between an operation on a first resource and an operation on a related resource of the first resource, a possible conflict can be discovered. In addition, in this embodiment, after a possible conflict is discovered, coordination on execution of the multiple operations or on execution of the operation on the related resource is implemented to avoid occurrence of the conflict during the operation on the same resource or the related resource.

In an optional embodiment, the determining unit 91 determines whether the execution times of the multiple operations on the first resource are identical, and if the execution times are identical, determines that a conflict exists. The processing unit 92 obtains priorities respectively corresponding to the multiple operations, and coordinates execution of the multiple operations according to the obtained priorities.

The resource operation apparatus 9 may receive multiple SON requests at the same time, where each SON request is used to instruct an operation on a same resource (the first resource) therein, to implement a corresponding SON function. When the first resource is a parameter of a cell or a parameter of a base station, in some SON requests, it is required to increase the value of the first resource, while in some SON requests, it is required to decrease the value of the first resource. Apparently, if these SON requests are executed at the same time, the first resource is repeatedly modified and becomes unpredictable, which may cause deterioration of network performance and even lead to chaos in a network. Therefore, when it is discovered that these SON requests are used to operate the same resource at the same time, a determination result of the determining unit 91 is that a conflict exists between the operations corresponding to these SON requests, and conflict coordination needs to be performed.

The priorities respectively corresponding to the multiple operations obtained by the processing unit 92 are pre-configured for the multiple operations, for example, in a network planning stage, a first priority is configured for the ES operation, and a second priority is configured for the CCO operation.

The coordinating, by the processing unit 92, execution of the multiple operations includes any one or a combination of the following: adjusting an execution sequence of the multiple operations, forbidding execution of an operation with a relatively low priority in the multiple operations, and adjusting the execution time of each operation in the multiple operations to make an interval between the execution times of the operations greater than or equal to a set confliction period.

The adjusting an execution sequence of the multiple operations may be implementing the operations sequentially according to the priorities. The forbidding execution of an operation with a relatively low priority in the multiple operations may be that, for example, assuming that an operation A, an operation B and an operation C exist and the priority of the operation A is the highest, the priority of the operation B is intermediate, and the priority of the operation C is the lowest, only the operation A can be executed, and the execution of the operation B and the operation C which have lower priorities than the operation A in the three operations is forbidden; or the operation A and the operation B are executed, and the execution of the operation C which has a lower priority than both the operation A and the operation B in the three operations is forbidden. For example, the ES operation corresponds to a first priority (highest), the COC operation corresponds to a second priority, and when a conflict occurs in a case that the ES operation and the COC operation need to be performed on the Tilt parameter of the cell 2 at the same time, according to the priorities of the ES operation and the ANR operation, the ES operation is executed preferentially, and the COC operation is delayed or is rejected. It should be noted that, if the ES operation is also set with a confliction period, the execution time of the COC operation should be delayed till the confliction period ends.

This embodiment mainly puts forward an operation coordinating method when a conflict occurs in a case that multiple operations are performed on a same resource at the same time, so as to avoid the conflict.

In another optional implementation manner, the determining unit 91 determines whether an interval between the execution times of the multiple operations on the first resource is within a set confliction period, and if yes, determines that a conflict exists. The processing unit 92 coordinates execution of the multiple operations according to priorities respectively corresponding to the multiple operations.

The priorities respectively corresponding to the multiple operations may be pre-configured, and before implementing the conflict coordination, the processing unit 92 further obtains the priorities respectively corresponding to the multiple operations.

Specifically, the coordinating, by the processing unit 92, execution of the multiple operations includes: adjusting an execution sequence of the multiple operations, forbidding execution of an operation with a relatively low priority in the multiple operations, and adjusting the execution time of each operation in the multiple operations to make an interval between the execution times of the operations greater than or equal to a set confliction period. In this embodiment, the execution time of each operation in the multiple operations is mainly adjusted to make the interval between the execution times of the operations greater than or equal to the set confliction period.

The following describes this embodiment by using an example where the operations are the ES operation and the COC operation, and the first resource is the Tilt parameter of the cell 2.

The cell 1 executes the ES operation at a time t1 to modify the Tilt parameter of the cell 2, and the ES operation is set with a confliction period, where the confliction period is T (for example, half an hour or 2 hours); the cell 2 needs to perform the COC operation at a time t2 (a difference between t2 and t1 is smaller than T), to modify the Tilt parameter of the cell 2; because the difference between t2 and t1 is smaller than T, the COC operation and the ES operation of the cell 2 conflict with each other, that is, multiple operations on the same resource at different times conflict with each other, and in this case, the cell 2 cannot execute the COC operation at the time t2, that is, the cell 2 is forbidden from executing the COC operation within the time (t1+T). It should be noted that, if the priority of the COC operation is higher than the priority of the ES operation, the cell 2 can interrupt the execution of the ES operation and perform the COC operation.

In another optional implementation manner, the determining unit 91 determines whether the execution times of the operation on the first resource and the operation on the related resource of the first resource are identical, and if yes, determines that a conflict exists. The processing unit 92 obtains priorities respectively corresponding to the operation on the first resource and the operation on the related resource of the first resource. The priority corresponding to the operation on the first resource and the priority corresponding to the operation on the related resource of the first resource may be pre-configured. Optionally, the processing unit 92 may be further configured to coordinate execution of the operation on the first resource and the operation on the related resource of the first resource according to the priorities.

Specifically, the coordinating, by the processing unit 92, execution of the operation on the first resource and the operation on the related resource of the first resource includes any one or more of the following: adjusting an execution sequence of the operation on the first resource and the operation on the related resource of the first resource, forbidding execution of an operation with a lower priority in the operation on the first resource and the operation on the related resource of the first resource, and adjusting execution time of each operation in the operation on the first resource and the operation on the related resource of the first resource to make an interval between the execution times of the operations greater than or equal to a confliction period.

This embodiment is specific to related resources. The association between the resources may be predefined, for example, when a resource is the Tilt parameter of the cell 1, it is defined that a related resource of the Tilt parameter of the cell 1 includes: the Tx Power parameter of the cell 1, and the Tilt parameter and the Tx Power parameter of the cell 2 (a neighboring cell of the cell 1).

In another optional implementation manner, the determining unit 91 determines whether an interval between execution times of the operation on the first resource and the operation on the related resource of the first resource is within a set confliction period, and if yes, determines that a conflict exists. The processing unit 92 coordinates execution of the operation on the first resource and the operation on the related resource of the first resource according to priorities respectively corresponding to the operation on the first resource and the operation on the related resource of the first resource.

The priorities respectively corresponding to the operation on the first resource and the operation on the related resource of the first resource may be pre-configured, and before implementing the operation coordination, the processing unit 92 is further configured to obtain the priorities respectively corresponding to the operation on the first resource and the operation on the related resource of the first resource.

Specifically, the coordinating, by the processing unit 92, execution of the operation on the first resource and the operation on the related resource of the first resource includes any one or more of the following: adjusting an execution sequence of the operation on the first resource and the operation on the related resource of the first resource, forbidding execution of an operation with a lower priority in the operation on the first resource and the operation on the related resource of the first resource, and adjusting execution time of each operation in the operation on the first resource and the operation on the related resource of the first resource to make an interval between the execution times of the operations greater than or equal to a confliction period.

The following describes this embodiment by using an example where the operations are the ES operation and the COC operation, the first resource is the Tx Power parameter of the cell 1, and a related resource of the first resource is the Tilt parameter of the cell 2.

The cell 1 executes the ES operation at a time t1 to modify the Tx Power parameter of the cell 1, and the ES operation is set with a confliction period, where the confliction period is T (for example, half an hour or 2 hours); the cell 2 needs to perform the COC operation at a time t2 (a difference between t2 and t1 is smaller than T), to modify the Tilt parameter of the cell 2; because the Tx Power parameter and the Tilt parameter are related parameters and the difference between t2 and t1 is smaller than T, the COC operation of the cell 2 and the ES operation of the cell 1 conflict with each other, that is, multiple operations on related resources at different times conflict with each other, and in this case, the cell 2 cannot execute the COC operation at the time t2, that is, the cell 2 is forbidden from executing the COC operation within the time (t1+T). However, if the priority of the COC operation is higher than the priority of the ES operation, the cell 2 can interrupt the execution of the ES operation and perform the COC operation.

Persons of ordinary skill in the art may understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disk, a read-only memory (ROM), or a random access memory (RAM).

The foregoing disclosures are merely exemplary embodiments of the present invention, and are not intended to limit the scope of rights of the present invention. A person of ordinary skill in the art may understand that all or a part of the processes of the foregoing embodiments may be implemented, and any equivalent variation made according to the claims of the present invention shall still fall within the scope of the present invention.

What is claimed is:

1. A resource operation method, comprising:
   determining whether a conflict exists in the two operations; and
   if a conflict exists in two operations, implementing conflict coordination on execution of the two operations;
   wherein one of the two operations is a first operation on a first resource, and the other one of the two operations is a second operation on the first resource or a third operation on a related resource of the first resource;
   wherein
   the first resource comprises one or more of the following: a parameter of the cell, a parameter of the base station, a cell, and a base station; and
   the related resource of the first resource comprises one or more of the following: a resource that is adjacent to the first resource, a resource that has a mutual influence with the first resource, and a resource that is set with an association with the first resource.

2. The method according to claim 1, wherein the conflict existing in the two operations comprises:
   an interval between execution times of the two operations is within a set confliction period, or execution times of the two operations are identical.

3. The method according to claim 2, wherein the implementing conflict coordination on execution of the two operations comprises one or a combination of the following:
   adjusting an execution sequence of the two operations,
   forbidding execution of an operation with a relatively low priority in the two operations, and
   adjusting the execution time of each operation in the two operations to make an interval between the execution times of the operations greater than or equal to a set confliction period.

4. The method according to claim 2, wherein the set confliction period comprises one of the following:
   a uniformly set confliction period,
   a confliction period designated for the operation on the first resource,
   a confliction period designated for the operation on the related resource of the first resource, and
   a smaller value, a greater value, or a sum of the confliction period designated for the operation on the first resource and the confliction period designated for the operation on the related resource of the first resource.

5. The method according to claim 3, wherein before the implementing conflict coordination on execution of the two operations, the method further comprises:
   pre-configuring the priorities respectively corresponding to the two operations, or obtaining the priorities respectively corresponding to the two operations.

6. The method according to claim 1, wherein one of the two operations is a self organizing network (SON) operation or a manual operation.

7. The method according to claim 1, wherein the first resource and the related resource of the first resource are respectively two of the following: a tilt of an antenna, power of the antenna, and an azimuth of the antenna.

8. The method according to claim 1, wherein the first resource is a cell individual offset (CIO), and the related resource of the first resource is a cell load.

9. The method according to claim 1, wherein
   the first resource is a cell, and the related resource of the first resource is a neighboring cell of the cell; or
   the first resource is a base station, and the related resource of the first resource is a neighboring base station of the base station; or
   the first resource is a parameter of a cell, and the related resource of the first resource is a parameter of a neighboring cell of the cell; or
   the first resource is a parameter of a base station, and the related resource of the first resource is a parameter of a neighboring base station of the base station.

10. The method according to claim 1, wherein one of the first resource and the related resource of the first resource has attribute information, and the attribute information comprises one or a combination of the following:
    an operator attribute, used to record information of an operator who sets or modifies the resource, wherein the information comprises: at least one piece of information of an operation name, a type, and an operation priority;
    a state attribute, used to indicate an operation state of the resource, wherein the operation state comprises: a modified state, a conflict state or a normal state;
    a related resource list attribute, used to record information about a related resource or a related resource list of the resource;
    a confliction period attribute, used to indicate an effective time period of a conflict with the resource; and
    an operating resource list attribute, used to record another resource operated by the operation on the resource.

11. A resource operation apparatus, comprising a processor, wherein the processor is configured to:
    determine whether a conflict exists in two operations, wherein one of the two operations is a first operation on a first resource, and the other one of the two operations is a second operation on the first resource or a third operation on a related resource of the first resource; and
    when a determination result of the processor is that a conflict exists in the two operations, implement conflict coordination on execution of the two operations;
    wherein
    the first resource comprises one or more of the following: a parameter of the cell, a parameter of the base station, a cell, and a base station; and
    the related resource of the first resource comprises any one or more of the following: a resource that is adjacent to the first resource, a resource that has a mutual influence with the first resource, and a resource that is set with an association with the first resource.

12. The apparatus according to claim 11, wherein the processor is further configured to:
    when an interval between execution times of the two operations is within a set confliction period, determine that a conflict exists in the two operations; or
    when execution times of the two operations are identical, determine that a conflict exists in the two operations.

13. The apparatus according to claim 12, wherein the processor is further configured to perform any one or a combination of the following:
    adjusting the execution time of each operation in the two operations to make an interval between the execution times of the operations greater than or equal to a set confliction period,
    forbidding execution of an operation with a relatively low priority in the two operations, and
    adjusting an execution sequence of the two operations.

14. The apparatus according to claim 12, wherein the set confliction period comprises any one of the following:
    a smaller value, a greater value, or a sum of the confliction period designated for the operation on the first resource and the confliction period designated for the operation on the related resource of the first resource, a confliction period designated for the operation on the first resource, a confliction period designated for the operation on the related resource of the first resource, and a uniformly set confliction period.

15. The apparatus according to claim 13, wherein the processor is further configured to, before implementing conflict coordination on execution of the two operations, pre-configure the priorities respectively corresponding to the two operations, or obtain the priorities respectively corresponding to the two operations.

16. The apparatus according to claim 11, wherein any one of the two operations is: a self organizing network (SON) operation or a manual operation.

17. The apparatus according to claim 11, wherein the first resource and the related resource of the first resource are respectively any two of the following: a tilt of an antenna, power of the antenna and/or an azimuth of the antenna.

18. The apparatus according to claim 11, wherein the first resource is a cell individual offset (CIO), and the related resource of the first resource is a cell load.

19. The apparatus according to claim 11, wherein the first resource is a cell, and the related resource of the first resource is a neighboring cell of the cell; or the first resource is a base station, and the a related resource of the first resource is a neighboring base station of the base station; or the first resource is a parameter of a cell, and the a related resource of the first resource is a parameter of a neighboring cell of the cell; or the first resource is a parameter of a base station, and the a related resource of the first resource is a parameter of a neighboring base station of the base station.

20. The apparatus according to claim 11, wherein any one of the first resource and the related resource of the first resource has attribute information, and the attribute information comprises any one or a combination of the following:

an operator attribute, used to record information of an operator who sets or modifies the resource, wherein the information comprises: at least one piece of information of an operation name, a type and an operation priority;

a state attribute, used to indicate an operation state of the resource, wherein the operation state comprises: a modified state, a conflict state or a normal state;

a related resource list attribute, used to record information about a related resource or a related resource list of the resource;

a confliction period attribute, used to indicate an effective time period of a conflict with the resource; and an operating resource list attribute, used to record another resource operated by the operation on the resource.

* * * * *